(12) United States Patent
Anderson

(10) Patent No.: US 6,543,589 B2
(45) Date of Patent: Apr. 8, 2003

(54) METHOD FOR CONTROLLING THE DAMPING FORCE OF A DAMPER

(76) Inventor: Richard D. Anderson, 1893 Gainsborough Dr., Atlanta, GA (US) 30341

( * ) Notice: Subject to any disclaimer, the term of this patent is extended or adjusted under 35 U.S.C. 154(b) by 0 days.

(21) Appl. No.: 09/866,403

(22) Filed: May 25, 2001

(65) Prior Publication Data

US 2002/0079176 A1 Jun. 27, 2002

Related U.S. Application Data

(60) Provisional application No. 60/207,549, filed on May 26, 2000.

(51) Int. Cl.[7] .................................................. F16F 9/53
(52) U.S. Cl. .................................................. 188/267.2
(58) Field of Search .............................. 188/267, 267.1, 188/267.2; 267/141, 150

(56) References Cited

U.S. PATENT DOCUMENTS

| | | | |
|---|---|---|---|
| 4,887,699 A | | 12/1989 | Ivers et al. |
| 4,992,190 A | * | 2/1991 | Shtarkman ............... 252/62.52 |
| 5,277,281 A | * | 1/1994 | Carlson et al. .......... 188/267.2 |
| 5,458,219 A | | 10/1995 | Anderson |
| 5,628,499 A | * | 5/1997 | Ikeda et al. ............ 267/140.14 |
| 6,123,312 A | * | 9/2000 | Dai ............................ 248/550 |

FOREIGN PATENT DOCUMENTS

JP 06099717 * 4/1994

* cited by examiner

Primary Examiner—Christopher P. Schwartz
(74) Attorney, Agent, or Firm—Baker, Donelson, Bearman & Caldwell

(57) ABSTRACT

A method for controlling the damping force of a damper containing a movable object in a magneto-rheological fluid, in which a positive magnetic field is applied to the fluid to achieve an increase in viscosity (and an increase in damping force) and the polarity of the magnetic field is reversed by negative electrical energy to remove residual magnetism before reestablishing the magnetic field at a lower level to achieve a predictable decrease in viscosity (and a decrease in damping force).

8 Claims, 1 Drawing Sheet

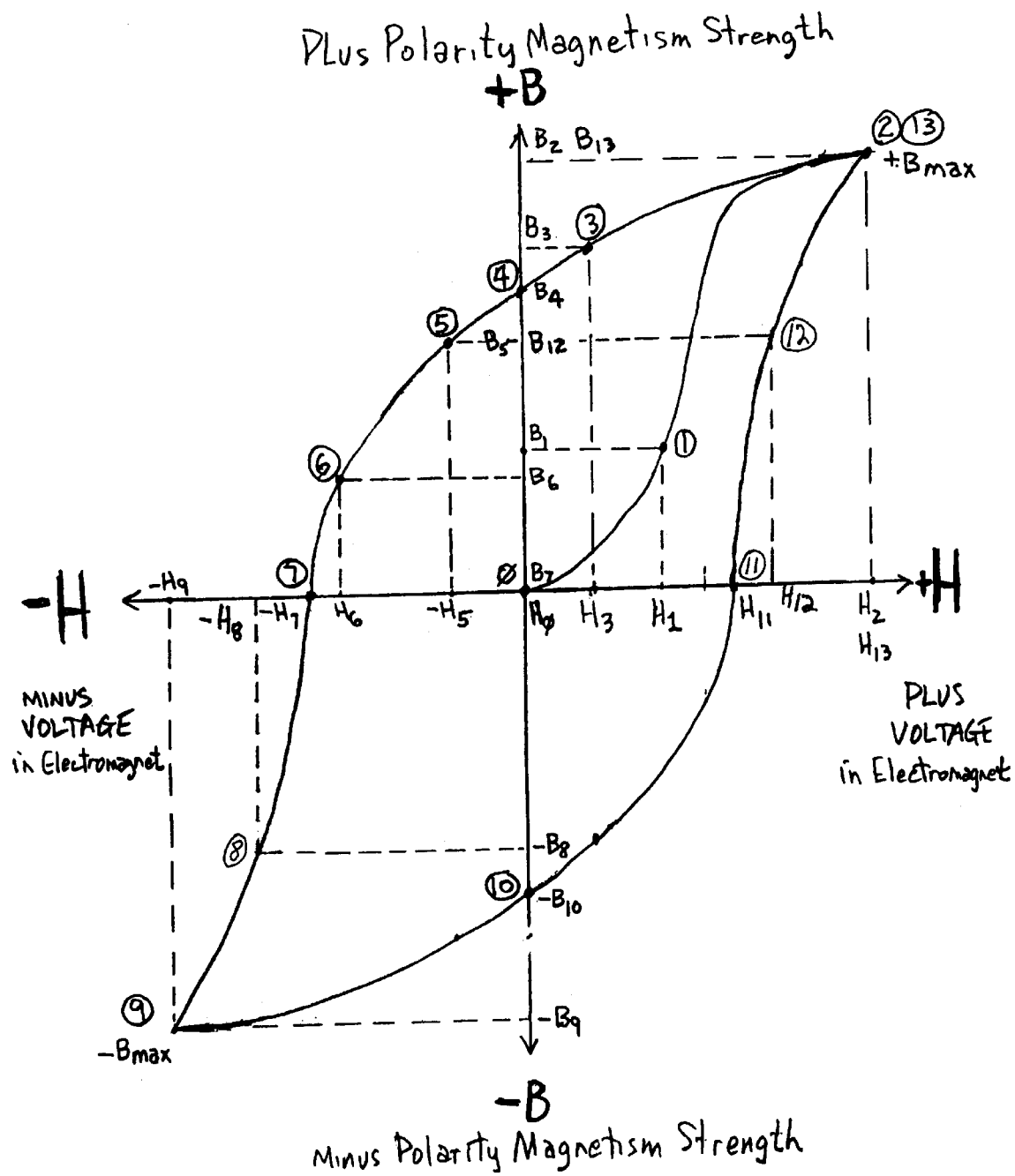
FIGURE

METHOD FOR CONTROLLING THE DAMPING FORCE OF A DAMPER

This application claims the benefit of U.S. Provisional Application Ser. No. 60/207,549, filed May 26, 2000.

TECHNICAL FIELD

The present invention relates to a method for use with a damper. In a more specific aspect, this invention relates to a method for controlling the damping force of a damper.

As used in this application, the term "damper" refers to an apparatus having a movable object (such as a piston, rotor or rod) within a fluid which is subject to changes in viscosity, and the term "damping force" refers to the resistance to movement of the movable object. More specifically, the term "damper" includes conventional piston-type shock absorbers, rotary shock absorbers and any other apparatus in which movement or motion of the movable object is dampened (i.e., resisted or reduced) by the viscosity of the fluid.

In many instances, this invention will be described in detail with specific reference to conventional piston-type shock absorbers. However, this invention will be understood as applicable to other types of dampers, such as rotary shock absorbers.

BACKGROUND OF THE INVENTION

In a conventional type of shock absorber, a piston is carried on the end of a reciprocating rod that extends from the shock absorber cylinder and is connected to one part of a movable mass, such as the chassis of a motor vehicle, while the body of the shock absorber is connected to the vehicle running gear. Alternatively, these mountings can be reversed for inverted mounting of the shock absorber.

Alternatively, the damper can be a rotary shock absorber which normally has a lever extending from the shock absorber body and connected to one part of a movable mass, such as the chassis of a motor vehicle or the vehicle running gear. The connection is normally by an articulated line.

However, in many situations such as auto races, the driver needs greater control over the operation of a shock absorber than is possible with conventional or rotary shock absorbers. Greater control is essential in handling a fast-moving car on a race track to achieve safety and a "winning edge". In a shock absorber, this translates into greater control over the damping force of the shock absorber.

Consequently, there is a need in this industry for a method which will provide greater control over the damping force of a shock absorber.

SUMMARY OF THE INVENTION

Briefly described, the present invention provides a method especially adapted for controlling the damping force of a magneto-rheological shock absorber. As used in this application, the term "magneto-rheological shock absorber" (or M-R shock absorber) refers to a shock absorber in which a magneto-rheological fluid (or M-R fluid) is used in place of an oil. A M-R shock absorber has an electromagnetic coil which is designed to produce a magnetic field (i.e., by magnetizing the M-R fluid) as such fluid flows through one or more passageways in the shock absorber and dampens (or resists) motion of the piston, rotor, rod or other movable object in the shock absorber.

The viscosity of the M-R fluid will change in response to the strength of the magnetic field. Further, the strength of the magnetic field will vary depending upon an electrical current or voltage which is provided to the electromagnetic coil in the M-R shock absorber.

More specifically, as the strength of the magnetic field increases, the viscosity of the M-R fluid increases, which results in an increase in the damping force of the M-R shock absorber. Conversely, as the strength of the magnetic field decreases, the viscosity of the M-R fluid decreases, which results in a decrease in the damping force of the M-R shock absorber. The increase or decrease in the damping force of the M-R shock absorber provides the driver with greater control over the car being operated by such driver.

Accordingly, an object of this invention is to provide a method for use with a damper.

Another object of this invention is to provide a method for controlling the damping force of a damper.

Another object of this invention is to provide a method for use with a shock absorber.

Another object of this invention is to provide a method for controlling the damping force of a shock absorber.

Another object of this invention is to provide a method which utilizes and deals with the principle of magnetic hysteresis.

Still another object of this invention is to provide a method which will provide the driver with greater control over the car being operated by such driver.

Still another object of this invention is to provide a method which will provide the driver of a race car with greater control over the car at high speeds and various track conditions in racing situations.

Still another object of this invention is to provide a method which will provide a driver with greater control over the handling of a vehicle while traversing varying road conditions or varying loads on the vehicle.

These and other objects, features and advantages of this invention will become apparent from the following drawing and detailed description.

BRIEF DESCRIPTION OF THE DRAWING

The FIGURE represents a typical hysteresis loop for the method of the present invention.

DETAILED DESCRIPTION OF THE INVENTION

The present invention provides a method for controlling the damping force of a damper, wherein the method comprises the steps of:

providing a vehicle with a damper having a movable object located within a magneto-rheological fluid, wherein the damping force of the damper is controlled by the viscosity of such fluid;

providing a controller which is in communication with the damper, wherein the controller controls the provision of electrical energy to an electromagnetic coil in the damper;

utilizing the controller to provide electrical energy to the electromagnetic coil, wherein a positive voltage produces a magnetic field as the magneto-rheological fluid flows through a passageway in the damper to increase the viscosity of the fluid and thereby increase the damping force of the damper; and utilizing the controller to reverse the polarity of the electrical energy provided to the electromagnetic coil, wherein a reduced negative voltage reduces the magnetic field in the magneto-rheological fluid to decrease the viscosity of the fluid and thereby decrease the damping force of the damper.

As stated earlier in this application, the preferred damper for use with the method of this invention is a conventional piston-type shock absorber. With this shock absorber, the preferred M-R fluid is a magneto-rheological fluid which is available commercially from Lord Corporation, Cary, N.C. The M-R fluid is a suspension of micron-sized, magnetizable particles in an oil. Normally, the M-R fluid is a free-flowing liquid with a consistency similar to that of motor oil. However, when a magnetic field is applied to the M-R fluid, the apparent viscosity changes, and the M-R fluid thickens. The degree of change in viscosity is basically proportional to the magnitude of the applied magnetic field, and the resulting damping force of the shock absorber changes in proportion to the viscosity.

By changing the magnetic field applied to the M-R fluid, either by positive electrical energy or by reversing the magnetic field with negative electrical energy, the damping force can be rapidly changed to provide greater control to the driver of a vehicle. There is no apparent difference in the viscosity of the M-R fluid with either a positive or negative polarity of magnetism.

However, there is a problem. Whenever the current is turned off, the magnetism is not completely removed, and when the current is reduced the magnetism is not reduced proportionally as a residual magnetism remains in the electromagnet. This residual magnetism is a function of the characteristics of the metal (usually an iron alloy) used in the electromagnet, and these characteristics can be quantified and explained by analyzing the hysteresis curve for the particular metal being used.

As used in this application, the term "hysteresis" refers to a lag of effect when the forces acting on a body are changed, as a lag in magnetization of a ferromagnetic substance when the magnetizing force is changed.

With reference to the FIGURE, a typical hysteresis loop is shown for this invention in which H (or 0) indicates no electrical current or voltage. More specifically, 1. As the voltage increases to $H_1$, the magnetism increases to $B_1$.
2. At a voltage of $H_2$ the material is "saturated" as the material's maximum magnetic "strength" of $B_2$ (or $+B_{max}$) is reached.
3. As voltage is reduced to $H_3$, the magnetism goes down very slowly to $B_3$, even though voltage was reduced by about 80% (to 20% of $H_2$ in the FIG.). This is magnetic hysteresis. The magnetism at $B_3$ is only reduced by about 20%. Thus, when decreasing voltage, the magnetism reduction is not linear because of residual magnetism (an 80% reduction of voltage only achieves a 20% reduction of magnetism).
4. In fact at the point $B_4$ the power is off (H = 0) and the residual magnetism is about 70% of $+B_{max}$.
5. Reversing the polarity of the voltage to $-H_5$ (about -20% of $+H_{max}$) reduces the magnetism by approximately another 15% (Note: there is "+" magnetism and "−" voltage) to $+B_5$.
6. Further reversing (applying a stronger negative voltage) to $-H_6$ reduces the magnetism to $+B_6$. (Note: there is still a "+" magnetism (less than $H_5$) but at a greater negative voltage ($-H_6$).
7. Further increasing the reverse voltage to $-H_7$ finally removes the residual magnetism (B = 0).
8. Increasing the reverse voltage then reverses magnetic polarity and continues to a magnetic field strength of $B_8$ (maybe 60% of maximum in the FIG. $-B_{max}$) at voltage $-H_8$.
9. Increasing the negative voltage to $-H_9$ produces a magnetism level $-B_{max}$ which results in an equivalent magnetic strength as before (same negative voltage gives same negative magnetic strength as $+B_{max}$), only reversed. This is saturation again in the other direction/polarity.
10. Lowering the voltage only somewhat reduces the magnetic strength (as in 3 thru 4) due to residual magnetism. $H_{10}$ is the same as $H_4$ (zero voltage). $B_4$ is the same magnetic strength as $-B_{10}$, but now of reversed polarity.
11. Reversing the voltage again (once again positive) lowers the magnetism (which is still negative polarity) slowly (as in steps 5–7) until at $+H_{11}$ voltage the magnetism is removed (B = 0).
12. But (like in 8) further reversing the reverse voltage then reverses polarity (this time positive as in the beginning steps) up to a field strength of $+B_{12}$, approximately 60% of $B_{max}$ at voltage $H_{12}$.
13. Increasing voltage to $H_{13}$ results in a saturation level of $B_{max}$. The cycle starts to repeat as from step 3 on.

When voltage to the electromagnetic coil (or electromagnet) is increased, the magnetism and damping force are increased. This effect continues to the saturation point. There is a point before saturation of diminishing returns, where increases in voltage achieve smaller and smaller increases in magnetism.

However, from any voltage, a decrease in voltage will give very little decrease in magnetism because magnetizing the metal in the electromagnet produces a residual magnetism. Thus, turning off the power would leave the metal still magnetized but at a lower strength level.

We have been unable, therefore, to reduce voltage and expect a magnetic level similar to what we obtained while increasing the voltage. This is the hysteresis principle. In fact, to reduce the magnetic level, we can reverse the polarity of the electrical energy to reduce or remove the residual magnetism. Once removed, the voltage level remagnetizes the metal to a new "reversed polarity" level.

In the FIGURE, a reversed voltage will knock out the magnetism (or magnetic field) if we were at $+H_{max}$-saturation level with positive voltage. However, this will occur only if the new reversed level is at least equal to $-H_7$, which is about 60% of $H_{max}$. Any less voltage would not completely remove the residual magnetism, and an undesired and not easily predictable magnetic level would result. Therefore, we would not easily know what damping force to expect in the shock absorber.

In the hysteresis loop shown in the FIGURE, each time we want to reduce damping we must reverse the polarity of the current (to erase the residual magnetism) to a level at least "−60%" (reversed polarity at 60% voltage) for the new magnetism level to go to a predictable level (but reversed in polarity also). This will be a predictable high level but less than the original or prior level. This will also have residual magnetism but less than before.

To attain a lower level from this point, we can do essentially the same thing—reverse the polarity of the electrical energy again (back to positive at a level at least 60% of the prior voltage level) so reversed polarity will remove the new residual magnetism level and establish a new lower level of reversed magnetic polarity.

Preferably, the electromagnet is magnetized to saturation level at least once before the driver begins operation of the car; because, as can be seen from the FIGURE, when the magnetic field starts (at position 0, voltage 0, magnetism level 0) the increase is different up to saturation level (position 2). After that, the magnetic field does not tend to return to the "initial response" shown between 0, 1 and 2.

Further reductions in magnetic level require a similar change (reverse polarity to approx −60% of the prior level) to get predictability.

Increasing the damping force is not so much of a problem as any increase in voltage to the electromagnet will increase the magnetism (and the corresponding residual magnetism level) up to the saturation point.

This hysteresis loop does not show what would happen if we increase voltage to a level significantly lower than saturation level. But a similar reaction is believed to occur—any magnetic level will produce residual magnetism and any reduction in voltage will have a lagging reduction of total magnetism, due to the presence of residual magnetism. Even if the electrical energy is turned off, the magnetic field will not be removed completely due to the presence of residual magnetism.

In the FIGURE, the metal has a large amount of hysteresis that is common for metals used in permanent magnets and in common steel alloys. Electromagnets are usually made from "soft" magnetic materials that have much less hysteresis, which means these materials have lower levels of residual magnetism and, therefore, would not require such "large level reversals" to erase the residual magnetism.

The communication between the controller (which can be operated by various means, such as the driver or a computer) and the electromagnetic coil in the shock absorber can be by several means, including electrical wires, radio signals, infrared signals, etc.

The electrical energy provided to the electromagnetic coil can be supplied by a car's electrical system, a separate battery or other means.

This invention has been described in detail with particular reference to certain embodiments, but variations and modifications can be made without departing from the spirit and scope of the invention as defined in the following claims.

What is claimed is:

1. A method for controlling the damping force of a damper, wherein the method comprises the steps of:

A. providing a vehicle with a damper having a movable object located within a magneto-rheological fluid, wherein the damping force of the damper is controlled by the viscosity of such fluid;

B. providing a controller which is in communication with the damper, wherein the controller controls the provision of electrical energy to an electromagnetic coil in the damper;

C. utilizing the controller to provide electrical energy to the electromagnetic coil, wherein a positive voltage produces a magnetic field as the magneto-rheological fluid flows through a passageway in the damper to increase the viscosity of the fluid and thereby increase the damping force of the damper; and D. utilizing the controller to reverse the polarity of the electrical energy provided to the electromagnetic coil, wherein a reduced negative voltage reduces the magnetic field in the magneto-rheological fluid to decrease the viscosity of the fluid and thereby decrease the damping force of the damper.

2. A method as defined by claim 1 wherein the damper is a shock absorber.

3. A method as defined by claim 2 wherein the shock absorber is a piston-type shock absorber.

4. A method as defined by claim 2 wherein the shock absorber is a rotary-type shock absorber.

5. A method as defined by claim 1 wherein the movable object is a piston.

6. A method as defined by claim 1 wherein the movable object is a rotor.

7. A method as defined by claim 1 wherein the movable object is a rod.

8. A method as defined by claim 1 wherein the controller is a computer.

* * * * *